United States Patent [19]

Price et al.

[11] Patent Number: 4,535,143

[45] Date of Patent: Aug. 13, 1985

[54] PROCESS FOR THE PREPARATION OF COPOLYCARBONATES OF SULFONYL DIPHENOL

[75] Inventors: Ronald L. Price, Moundsville, W. Va.; Mark W. Witman; Sivaram Krishnan, both of Pittsburgh, Pa.

[73] Assignee: Mobay Chemical Corporation, Pittsburgh, Pa.

[21] Appl. No.: 637,945

[22] Filed: Aug. 6, 1984

[51] Int. Cl.$^3$ ............................................. C08G 63/62
[52] U.S. Cl. ................................ 528/174; 528/199; 528/200; 528/204
[58] Field of Search ............... 528/174, 199, 200, 204

[56] References Cited

U.S. PATENT DOCUMENTS

| | | | |
|---|---|---|---|
| 3,269,986 | 8/1966 | Goldberg | 528/174 |
| 3,271,367 | 9/1966 | Schnell et al. | 528/174 |
| 3,419,526 | 12/1968 | Schnell et al. | 528/174 |
| 3,737,409 | 6/1973 | Fox | 528/174 |
| 3,912,688 | 10/1975 | Schiller et al. | 260/49 |
| 4,275,187 | 6/1981 | Quinn et al. | 528/174 |
| 4,303,776 | 12/1981 | Baron et al. | 528/174 |
| 4,306,055 | 12/1981 | Baron et al. | 528/174 |
| 4,404,351 | 9/1983 | Käfer et al. | 528/174 |

OTHER PUBLICATIONS

Interfacial Synthesis vol. III, Recent Advances, Carraher, Jr. & Preston, Marcel Dekker Inc., New York, NY.

Phase Transfer Catalysis, Principles and Techniques, Starks, C. M. and Liotta.

*Primary Examiner*—Lester L. Lee
*Attorney, Agent, or Firm*—Gene Harsh; Lawrence S. Pope; Aron Preis

[57] ABSTRACT

The present invention is directed to a continuous process for the preparation of copolycarbonates of sulfonyl diphenol (SDP) containing at least about 15, preferably about 15 to about 80 percent by weight of SDP and characterized in the particular system catalyzing the process reaction. The invention thus entails improvements and modifications to the known interfacial polycondensation process rendering it applicable to the preparation of copolycarbonates containing a high level of SDP comprising a combination of catalysts namely a phase transfer catalyst and a condensation catalyst.

8 Claims, No Drawings

PROCESS FOR THE PREPARATION OF COPOLYCARBONATES OF SULFONYL DIPHENOL

FIELD OF THE INVENTION

The invention is related to a process for the preparation of copolycarbonates and more particularly to an interfacial polycondensation process for the preparation of copolycarbonates containing units derived from sulfonyl diphenol.

BACKGROUND OF THE INVENTION

Copolycarbonates which contain as part of their molecular structure, derivatives of sulfonyl diphenyl have been recognized by the art to offer advantages in terms of flame resistance, good stress cracking characteristics, high service temperature and mechanical properties.

U.S. Pat. No. 3,269,986 discloses polycarbonate resins based on dihydroxy polysulfones prepared by transesterification or by polymerization in a homogeneous phase. U.S. Pat. No. 3,271,367 discloses the preparation of polycarbonates of dihydroxydiarylene sulfones. A two-phase interfacial polycondensation process is referred to and a preparation of copolycarbonates containing over 30 percent by weight of 4,4'-dihydroxydiphenyl sulfone is reported in Example 5. It is noted however that the example entailed the old "dough" batch process in which the viscous mass of polycarbonate and organic solvents are washed free of impurities in a kneader.

A batch reaction for the preparation of polycarbonates generally is one where all the reactants, except the carbonate precursor, i.e. phosgene, are first charged to the reactor and the carbonate precursor is then metered into the reaction mixture over a predetermined time. A drawback of this reaction is a localized imbalance of reactants which causes considerable side reactions to take place resulting in an inferior polycarbonate product.

In contrast, in the continuous reaction the reactants are metered in stoichiometric amounts, except for a slight excess of phosgene, into a mixing chamber (pre-condensation in a reactor cooler or primary reactor). This reaction results in a relatively low molecular weight product which contains chlorocarbonic end groups. Proceeding to the secondary condensation reaction where additional catalyst is introduced, the end groups hydrolyze and in the presence of additional base further react to build up the high molecular weight product.

In addition to the improvement in product quality, the continuous process is considerably more economical than the batch process.

U.S. Pat. No. 3,419,526 discloses the preparation of a copolycarbonate of 4,4'-bis[(4-hydroxy)phenoxy]-phenyl-sulfone in an interfacial process using triethylamine as catalyst. Films of a copolycarbonate of 75 percent by weight 4,4'-dihydroxyphenyl sulfone and 25 percent by weight of bisphenol-A were prepared in a homogeneous medium in accordance with Example I, part B of U.S. Pat. No. 3,737,409. Flame resistant copolycarbonate resins entailing structural units derived from 4,4'-dihydroxydiphenyl sulfone were disclosed in U.S. Pat. No. 3,912,688. Among the suitable catalysts in the phase-interface condensation process for the preparation of the copolycarbonates of that invention there are listed quaternary ammonium salts. Phase transfer catalysis for two-phase reactions including the interfacial polycondensation of polycarbonates has been reported. See Interfacial Synthesis, Vol. III, Recent Advances, Carraher, C. E. and Preston, J., editors, Marcel Dekker Inc., New York, and Phase Transfer Catalysis, Principles and Techniques, Starks, C. M. and Liotta, C. Schnell et al reported the use of tertiary amines or quaternary ammonium compounds for accelerating and improving the synthesis of polycarbonates—see for instance H. Schnell, "Chemistry and Physics of Polycarbonates", Interscience Publishers, New York, 1964. A bifurcated process for the preparation of copolycarbonates including substantial amounts of 4,4'-dihydroxydiphenyl sulfone is described in U.S. Pat. No. 4,404,351.

Copolycarbonates containing low levels of dihydroxydisulfone, i.e. less than 15 wt. %, may be prepared using interfacial reaction techniques. The incorporation of higher amounts however is known to cause loss of reaction control because unworkable emulsions are formed.

SUMMARY OF THE INVENTION

The present invention is directed to a continuous process for the preparation of copolycarbonates of sulfonyl diphenol (SDP) containing at least about 15, preferably about 15 to about 80, most preferably 20 to 50 percent by weight of SDP and characterized in the particular system catalyzing the process reaction. The invention thus entails improvements and modifications to the known interfacial polycondensation process rendering it applicable to the preparation of copolycarbonates containing a high level of SDP comprising a combination of catalysts namely a phase transfer catalyst and a condensation catalyst.

DETAILED DESCRIPTION OF THE INVENTION

Interfacial polycondensation as a process for the preparation of polycarbonates has long been known and practiced in the art. The process is described in H. Schnell, "Chemistry and Physics of Polycarbonates", Interscience Publishers, John Wiley & Sons, Inc., 1964, a document incorporated herein by reference. Essentially, the interfacial polycondensation process entails a reaction between one or more dihydroxy compounds with phosgene and/or a bischlorocarbonic ester of a dihydroxy compound. The aromatic dihydroxy compound, in the form of an alkali or an alkaline earth, metal salt in an aqueous solution or suspension is reacted with a carbonate precursor such as phosgene, carbonyl bromide or bischloroformic esters of the aromatic dihydroxy compounds. An organic solvent is provided in the reaction mixture which is a solvent for the polymer but not for the aromatic dihydroxy salts. Chlorinated or non-chlorinated aliphatic or aromatic hydrocarbons are used as the organic solvents which dissolve the condensation products. Suitable solvents include cyclohexane, methyl cyclohexane, benzene, toluene, xylene, methylene chloride, chloroform carbon tetrachloride and chlorobenzene. It has been recognized by those skilled in the art that while the preparation of copolycarbonates containing less than 15 percent by weight of SDP is readily carried out in a conventional interfacial polycondensation process, the incorporation of higher amounts of sulfonyl diphenol is not possible. Such attempts to prepare copolycarbonates failed because of loss of control of the reaction and because of the formation of unworkable emulsions.

In the present context, copolycarbonate resins may have a molecular weight (weight average) of about 10,000 to 200,000, preferably about 20,000 to about 80,000, and may have a melt flow rate per ASTM D-128 at 300° C. of about 1 to about 24 gm/10 minutes, preferably about 2–6 gm/10 minutes.

Dihydroxy compounds suitable for the preparation of the copolycarbonates of the invention conform to the structural formulae (1) or (2)

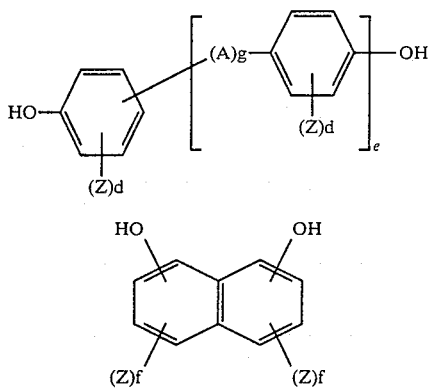

wherein
A denotes an alkylene group with 1 to 8 carbon atoms, an alkylidene group with 2 to 8 carbon atoms, a cycloalkylene group with 5 to 15 carbon atoms, a cycloalkylidene group with 5 to 15 carbon atoms, a carbonyl group, an oxygen or a sulfur atom or an —SO— radical or a radical of the general formula

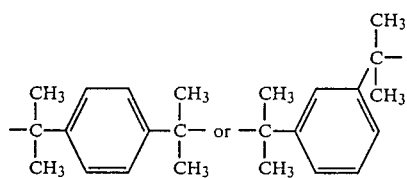

g denotes the number 0 or 1;
e denotes the number 0 or 1;
Z denotes F, Cl, Br or a $C_1$–$C_2$ alkyl and if several Z radicals are substituents in one aryl radical, they may be identical or different;
d denotes 0 or an integer of from 1 to 4; and
f denotes 0 or an integer of from 1 to 3.

Among the useful bisphenols in the practice of the invention are hydroquinone, resorcinol, bis-(hydroxyphenyl)-alkanes, bis-(hydroxyphenyl)-cycloalkanes, bis-(hydroxyphenyl)-ethers, bis-(hydroxyphenyl)-kentones, bis-(hydroxyphenyl)-sulfoxides and α,α-bis-(hydroxyphenyl)-diisopropylbenzenes. These and further suitable aromatic dihydroxy compounds are described, for example, in U.S. Pat. Nos. 3,028,365; 2,999,835; 3,148,172; 3,271,368; 2,991,273; 3,271,367; 3,280,078; 3,014,891 and 2,999,846 (all incorporated herein by reference), in German Offenlegungsschriften (German Published Specifications) Nos. 1,570,703; 2,063,050; 2,063,052; 2,211,956 and 2,211,957, in French Patent Specification No. 1,561,518 and in the monograph, H. Schnell, "Chemistry and Physics of Polycarbonates", Interscience Publishers, New York, 1964. Further examples of suitable bisphenols are 2,2-bis-(4-hydroxyphenyl)-propane (bisphenol A), 2,4-bis-(4-hydroxyphenyl)-2-methyl-butane, 1,1-bis-4-hydroxyphenyl)-cyclohexane, α,α-bis-(4-hydroxyphenyl)-p-diisoproylbenzene, 2,2-bis-(3-chloro-4-hydroxyphenyl)-propane and hydroxybenzophenone.

The most preferred bisphenol is 2,2-bis-(4-hydroxyphenyl)-propane (bisphenol A).

Monofuctional reactants such as monophenols may be used in order to limit the molecular weight. Branching agents having functionalities of three or more, especially compounds having three or more phenolic hydroxyl groups may be used for the preparation of branched resins. The amount of branching agent is about 0.05 to about 2.0 mol percent, relative to the diphenols employed.

Some examples of compounds with three or more than three phenolic hydroxyl groups which can be used are phloroglucinol, 4,6-dimethyl-2,4,6-tri-(4-hydroxyphenyl)-heptane, 2,4,6-trimethyl-2,4,6-tri-(4-hydroxyphenyl)-heptane, 1,4,5-tri-(4-hydroxyphenyl)-benzene, 1,1,1-tri-(4-hydroxyphenyl)-ethane, tri-(4-hydroxyphenyl)-phenylmethane, 2,2-bis-(4,4-bis-(4-hydroxyphenyl-cyclohexylpropane, 2,4-bis-(4-hydroxyphenylisopropyl)-phenol, 2,6-bis-(2-hydroxy-5'-methylbenzyl)-4-methylphenol, 2-(4-hydroxyphenyl)-2-(2,4-dihydroxyphenyl)-propane, hexa-(4-(4-hydroxyphenylisopropyl)-phenyl)-orthoterephthalic acid ester, tetra-(4-hydroxyphenyl)-methane, tetra-(4-(4-hydroxyphenylisopropyl)-phenoxy)-methane and 1,4-bis-(4',4''-dihydroxytriphenyl)-methyl)-benzene. Some of the other trifunctional compounds are 2,4-dihydroxy-benzoic acid, trimesic acid, cyanuric chloride and 3,3-bis-(4-hydroxyphenyl)-2-oxo-2,3-dihydroindole.

In the practice of the invention there are added to the reaction mixture at least about 15 wt. percent, perferably about 15 to 80 wt. percent most preferably 15 to about 50 wt. percent, relative to the weight of sulfonyl diphenols.

In the present context, sulfonyl diphenols include any aromatic dihydroxy componds having at least one sulfonyl bridging group. Among the sulfonyl diphenols suitable in the practice of the invention are sulfonyl diphenols as well as bis(4-hydroxyphenyl) biphenyl disulfone and bis(4-hydroxyphenyl sulfonyl phenyl) biphenyl disulfones and dihydroxy aromatic sulfones. U.S. Pat. Nos. 3,269,986 and 4,303,776 as well as Ser. No. 364,828 filed April 12, 1982, all of which are incorporated herein by reference, describe sulfonyl diphenols which are suitable in the present context. The preferred embodiments entail sulfonyl diphenols conforming to

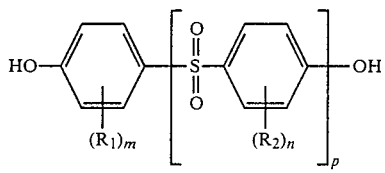

wherein $R_1$ and $R_2$ independently are a $C_1$–$C_3$ alkyl radical or a halogen atom and wherein m and n independently are an integer of from 0 to 4 and p is an integer equal to at least one.

The precondensation or phase transfer catalyst in the practice of the invention is a quaternary salt, preferably quaternary ammonium salts added during the precondensation step (reactor cooler) followed by the addition of a tertiary amine in the secondary polycondensation. The catalysts are added in sufficient amounts to avoid emulsions and to achieve a high molecular weight buildup. Preferably, the amount of the quaternary salt added is at a level of about 0.2–1.0 mol percent, most preferably 0.5 mol percent, relative to the total moles of the sulfonyl diphenol and aromatic dihydroxy compound.

Among the quaternary salts suitable in the present practice are quaternary ammonium bases such as tetrabutyl ammonium bromide, tetramethyl ammonium hydroxide, triethylbenzyl ammonium hydrazide, triethylbenzyl ammonium chloride, methyltriphenyl arsonium iodide, methyltriphenyl phosphonium iodide, benzyltriphenyl phosphonium chloride and p-xylylene-α,α'-bis(dihydroxyethyl)-sulfonium bromide.

Among the tertiary amine catalysts are triethylamine, N,N-dimethyl-cyclohexylamine and N-ethyl piperidine. The preferred amount of tertiary amine catalyst added is about 0.2 to about 1.0 mol percent, most preferably 0.25–0.5 mol percent relative to the total mols of the sulfonyl diphenol and aromatic dihydroxy compound.

The invention is demonstrated by the examples described below in which all parts and percentages are by weight unless otherwise specified.

EXAMPLE 1

A charge (consisting of 18.92 kg of bisphenol-A, 8.11 kg of sulfonyl diphenol (i.e. 4,4'-dihydroxy diphenyl sulfone), 134.32 kg of water, 18.83 kg of 50% sodium hydroxide, 400 grams of phenol and 20 grams of sodium thionite) was continuously phosgenated at a ratio of 33.92 kg of said charge per 2.43 kg of phosgene, in a suitable reaction vessel—average dwell time of about 10–12 minutes—in the presence of 0.5 mole percent (based on monomers) of tetrabutyl ammonium bromide (34.8 grams added as a 1% solution in water). An additional 2.01 kg of 25% sodium hydroxide is added during the primary reaction. 41.78 kg of methylene chloride/-monochlorobenzene (1:1) solution is used as a solvent for the precondensate as well as a carrier for the phosgene.

The precondensate is then further condensed (secondary condensation) in kettle cascade in the presence of 32.16 gm (1.44 mol %) of triethylamine and 0.8 kg of 25% sodium hydroxide at an average dwell time of about 30 minutes. The organic phase is separated off and washed with a 1% solution of sodium hydroxide, then with demineralized water followed by a wash with a 1% solution of phosphonic acid and finally two separate pure wash washes.

The polymer was recovered by concentrating the polymer solution followed by extrusion using a devolatizing extruder. The recovered polymer—containing 30 wt. percent (28.1 mol %) sulfonyl diphenol (SDP)—was analyzed and its properties noted as: relative viscosity 1.222; number average molecular weight 12,300; weight average molecular weight 25,000.

EXAMPLE 2

A similar process entailing no tetrabutyl ammonium bromide proved to be unworkable because of the formation in the primary reaction step of a highly emulsified reaction medium. A yet additional run similar in all respects to the process described in Example 1 except that 0.5 mole percent of n-ethyl piperidine was used, instead of the tetrabutyl ammonium bromide, proved unworkable due to the formation of a highly emulsified reaction medium.

EXAMPLE 3

A charge (consisting of 16.22 kg of bisphenol-A. 10.8 kg of sulfonyl diphenol, 134.68 kg of water, 18.47 kg of 50% sodium hydroxide, 332.6 grams of phenol and 20 grams of sodium thionite) was continuously reacted with phosgene at a ratio of 33.92 kg of said charge per 2.453 kg of phosgene in a suitable reaction vessel, in 41.78 kg of a mixture of methylene chloride/monochlorobenzene (1:1) in the presence of 0.5 mol percent of tetrabutyl ammonium bromide (34.92 gms added as a 1% solution in pure water). An additional 2.04 kg of 25% sodium hydroxide is added during the precondensate step.

The precondensate was then further condensed (secondary condensation) in a kettle cascade in the presence of 37.82 gms (1.44 mol percent) of triethylamine and 1.054 kg of 25 percent solution of sodium hydroxide at an average dwell time of about 30 minutes. The organic phase is then separated off and washed with 1% sodium hydroxide, pure water, 2% phosphoric acid, and two separate pure water washes, successively.

The polymer solution is then recovered by preconcentration followed by devolatilization extrusion to obtain a solvent-free polymer. The recovered polymer (40 wt. percent SDP, i.e. 37.8 mol percent) was analyzed and its properties noted as: relative viscosity 1.241, molcular weight: number average (Mn) 14,000 weight average, (Mw) 29,500.

EXAMPLE 4

Following the procedure of Example 3 above except that the amount of phenol in the charge was changed to 362.0 gms (3.25 mol percent), the recovered polymer was analyzed and its properties noted as relative viscosities 1.228, Mn=18,800, Mw=16,600.

EXAMPLE 5

Following the procedure of Example 3 above, except that triethylamine was replaced by 36.0 gms (1.44 mol percent) of n-ethyl piperidine, the recovered polymer was analyzed and its properties noted as: relative viscosity 1.265, melt index 2.91 gm/10 min. (per ASTM D-1238).

EXAMPLE 6

Following the procedure of Example 3 above except that 18.47 gms (0.25 mol percent of tetrabutyl ammonium bromide and 2.5 mol percent (276.6 gms) of phenol were substituted for the corresponding components. Also, instead of triethylamine, the procedure now entailed n-ethyl piperidine (1.44 mol percent, 36.0 gms). The recovered polymer was analyzed and its properties determined as follows; relative viscosity 1.321, melt index 2.21.

EXAMPLES 7–10

Further experiments designed to demonstrate the unexpected criticality of the point of introduction of the catalysts in the process of the invention were carried out. The results which were obtained upon these experiments show the advantage offered by the present process over the processes of the prior art such as represented by U.S. Pat. No. 3,271,367 (Example 5). The presently disclosed process requiring a specific combination of catalysts, i.e. a phase transfer catalyst such as tetrabutyl ammonium bromide, and triethylamine or n-ethyl piperidine, is characterized in that polycarbonates having higher molecular weights are obtained.

| Example | Catalyst used | | Relative Viscosity |
|---|---|---|---|
| | In pre-Condensation | Secondary Condensation | |
| 7 | TBAB[1] | none | 1.125 |
| 8 | TBAB | TBAB | 1.132 |
| 9 | TBAB | TEA[2] | 1.297 |
| 10 | TBAB | NEP[3] | 1.289 |

[1] tetrabutyl ammonium bromide
[2] triethylamine
[3] n-ethyl piperidine

The total dwell time (both primary and secondary reactions) entailed in the runs of Examples 7–10 was about 30 minutes. In fact, longer reaction times were found to have no practical effect on the process, that is no increase in molecular weight, in a variation using TBAB only. The results of these experiments are as follows:

| TBAB added at | Additional reaction time (hours) | Relative Viscosity |
|---|---|---|
| precondensation | 1 | 1.124 |
| precondensation | 2 | 1.120 |
| precondensation | 3 | 1.126 |
| precondensation and secondary condensation | 2 | 1.155 |
| precondensation and secondary condensation | 4 | 1.198 |

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A continuous process for the preparation of a copolycarbonate resin containing at least 15 wt. percent of at least one unit derived from an aromatic dihydroxy compound having at least one sulfonyl bridging group comprising a reaction between a mixture containing said aromatic dihydroxy compound and at least one sulfonyl-free aromatic dihydroxy compound and a carbonic acid precursor under the conditions of interfacial polycondensation characterized in that a quaternary salt at an amount sufficient to avoid formation of emulsion is present in the precondensation step and that a tertiary amine catalyst in a sufficient amount to effect the build-up of molecular weight is present in the secondary polycondensation step.

2. The process of claim 1 wherein said copolycarbonate contains about 15 to about 80 wt. percent of said units.

3. The process of claim 2 wherein said aromatic dihydroxy compound having at least one sulfonyl bridging group conforms to

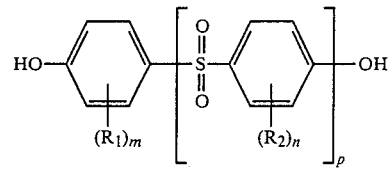

wherein $R_1$ and $R_2$ independently are $C_1$–$C_4$ alkyl or a halogen atom, m and n independently are an integer of from 0 to 4, and p is an integer at least equal to 1.

4. The process of claim 1 wherein said quaternary salt is present at an amount of 0.2 to about 1.0 mol percent relative to the total mols of said sulfonyl diphenol and said aromatic dihydroxy compound.

5. The process of claim 4 wherein said quaternary salt is a member selected from the group consisting of tetrabutyl ammonium bromide, tetramethyl ammonium hydroxide, triethylbenzyl ammonium hydroxide, triethylbenzyl ammonium chloride, methyltriphenyl arsonium iodide, methyltriphenyl phosphonium iodide, benzyltriphenyl phosphonium chloride and p-xylylene-α,α'-bis(dihydroxyethyl)sulfonium bromide.

6. The process of claim 1 wherein said tertiary amine is present at an amount of 0.2 to about 1.0 mol percent relative to the total weight of said sulfonyl diphenol and said aromatic dihydroxy compound.

7. The process of claim 6 wherein said tertiary amine is a member selected from the group consisting of triethylamine, N,N-dimethyl-cyclohexylamine and N-ethyl piperidine.

8. The process of claim 1 wherein said aromatic dihydroxy compound having at least one sulfonyl bridging group conforms to

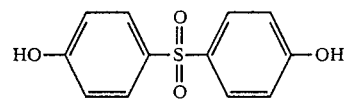

and said quaternary salt is tetrabutyl ammonium bromide and said tertiary amine is triethylamine.

* * * * *